(12) United States Patent
Osumi et al.

(10) Patent No.: US 6,572,692 B1
(45) Date of Patent: Jun. 3, 2003

(54) INK, METHOD FOR IMPROVING INTERMITTENT DISCHARGEABILITY OF INK-JET RECORDING APPARATUS, METHOD FOR RECORDING IMAGE, RECORDING UNIT, INK CARTRIDGE, INK SET, AND IMAGE RECORDING APPARATUS

(75) Inventors: Koichi Osumi; Shinya Mishina, both of Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/523,947

(22) Filed: Mar. 13, 2000

(30) Foreign Application Priority Data

Mar. 15, 1999 (JP) .............................. 11-068512
Jul. 16, 1999 (JP) .......................... 11-202990

(51) Int. Cl.[7] .............................................. C09D 11/00
(52) U.S. Cl. ................ 106/31.6; 106/31.65; 106/31.86; 106/31.8
(58) Field of Search ................. 106/31.6, 31.65, 106/31.86, 31.8

(56) References Cited

U.S. PATENT DOCUMENTS

| 5,184,148 A | 2/1993 | Suga et al. ................... 346/1.1 |
| 5,571,311 A | 11/1996 | Belmont et al. .......... 106/20 R |
| 5,609,671 A | 3/1997 | Nagasawa ................. 106/20 R |
| 5,630,868 A | * 5/1997 | Belmont .................... 106/31.27 |
| 5,746,818 A | 5/1998 | Yatake ..................... 106/31.86 |
| 5,922,118 A | * 7/1999 | Johnson et al. ............ 106/31.6 |
| 5,976,233 A | 11/1999 | Osumi et al. ............. 106/31.86 |
| 6,004,389 A | * 12/1999 | Yatake ..................... 106/31.86 |

FOREIGN PATENT DOCUMENTS

| JP | 55-65269 | 5/1980 |
| JP | 55-66976 | 5/1980 |
| JP | 3-134073 | 6/1991 |
| JP | 3-210373 | 9/1991 |
| JP | 8-3498 | 1/1996 |
| JP | 10-95941 | 4/1998 |
| JP | 10-510862 | 10/1998 |
| WO | WO 96/18695 | 6/1996 |

* cited by examiner

Primary Examiner—Helene Klemanski
Assistant Examiner—Veronica F. Faison
(74) Attorney, Agent, or Firm—Fitzpatrick, Cella, Harper & Scinto

(57) ABSTRACT

An ink contains a coloring material and an aqueous medium. The coloring material is composed of a self-dispersion-type carbon black. At least one hydrophilic group is bonded to the surface of the carbon black directly or through another atomic group. A $K_a$ value of the ink determined by a Bristow's test method is less than 1.5, and the total amount of monovalent cations in the ink is in a range of 0.05 to 1 mole/liter. This ink exhibits superior ink-jet recording characteristics.

23 Claims, 4 Drawing Sheets

INK, METHOD FOR IMPROVING INTERMITTENT DISCHARGEABILITY OF INK-JET RECORDING APPARATUS, METHOD FOR RECORDING IMAGE, RECORDING UNIT, INK CARTRIDGE, INK SET, AND IMAGE RECORDING APPARATUS

BACKGROUND OF THE INVENTION

1. Field of the Invention

The present invention relates to an ink, a method for improving intermittent discharge properties (hereinafter referred to as "dischargeability") of an ink-jet recording apparatus, a method for recording an image, a recording unit, an ink cartridge, ink set, and an image recording apparatus.

2. Description of the Related Art

Known black inks for writing implements, e.g., fountain pens, felt-tip pens, and aqueous ballpoint pens, and for ink-jet recording devices contain carbon black as a black pigment and have a variety of compositions. These black inks enable high-density printing and have good printing fastness. In recent years, research and development on various compositions and physical properties of carbon black was performed with a view towards recording on a wide range of recording media, such as plain paper, e.g., copying paper which is typically used in offices, letter paper, bond paper, continuous business form paper, etc.

Japanese Patent Application Laid-Open No. 3-210373 discloses an ink containing acidic carbon black and an alkaline-soluble polymer. Japanese Patent Application Laid-Open No. 3-134073 discloses an ink-jet ink dispersion having good storage stability and superior dischargeability in bubble-jet recording apparatuses. Japanese Patent Application Laid-Open No. 8-3498 discloses an ink containing a self-dispersion-type carbon black, which can be dispersed into the ink without using any solvent, in order to solve technical problems of an ink containing carbon black and dispersant, that is, unstable dischargeability and low density of printed characters. PCT International Publication Number WO96/18695 (Japanese National Publication No. 10-510862) and U.S. Pat. No. 5,746,818 (corresponding to Japanese Patent Application Laid-Open No. 10-95941) disclose an ink-jet ink containing self-dispersion-type carbon black which can create high-quality images on recording media.

A known problem in conventional pigment-based inks is unstable dischargeability. For example, an ink is discharged from a given nozzle of an ink-jet recording head, the ink discharge is suspended for a predetermined time (for example, 20 seconds), and then the ink is discharged again (hereinafter, such discharge is referred to as "intermittent discharge"). In such a discharge mode, the ink may not be stably discharged, and thus the print quality may decrease in some cases (hereinafter, unstable dischargeability in intermittent discharge is referred to as "poor intermittent dischargeability").

When a black ink is used with inks of other colors (for example, at least one color ink selected from a magenta ink, a cyan ink, a yellow ink, a red ink, a green ink, and a blue ink) for color printing on a recording medium, these inks will blur and will be nonhomogenously mixed at boundaries between the black image sections and the color image on the recording medium in some cases, resulting in deterioration in image quality (hereinafter, referred to as "bleeding"). Several countermeasures for bleeding are reported. For example, Japanese Patent Application Laid-Open No. 55-65269 discloses addition of surfactant to an ink for improving ink penetrability into recording media, and Japanese Patent Application Laid-Open No. 55-66976 discloses use of volatile solvents in ink. In particular, high optical density (OD) and the formation of images having sharp edges are desirable qualities for black inks which are often used in the printing of characters, etc. The above-described ink showing improved penetration into recording media is believed to achieve both high optical density and the formation of images having sharp edges.

As quality in ink jet prints is becoming extremely high, expectations for the performance of black ink for ink-jet printing are rising. Regarding the black ink containing self-dispersion-type carbon black, however, enough knowledge for suppressing bleeding, or for achieving high OD, sharp edges, and satisfactory dischargeability in intermittent modes has not accumulated yet, and the behaviors of the ink during ink-jet recording are not fully known.

SUMMARY OF THE INVENTION

In view of the aforementioned technological background, the present inventors have conducted research on an ink containing a self-dispersion-type carbon black and discovered that intermittent dischargeability of the ink and ink fixation and image quality are greatly improved, when the amount of monovalent cations in an ink, whose penetration into plain paper is suppressed to a relatively low level, is controlled to be in a specific range.

Accordingly, an object of the present invention is to provide an ink containing a self-dispersion-type carbon black as a pigment and having superior ink-jet recording characteristics.

Another object of the present invention is to provide a method for improving intermittent dischargeability in ink-jet recording.

A further object of the present invention is to provide an ink set which can continuously produce images with suppressed bleeding.

Still another object of the present invention is to provide a method for recording images which can achieve high-quality printing with suppressed bleeding and satisfactory fixing and an image recording apparatus, and to provide an ink cartridge and a recording unit used therein.

According to a first aspect of the present invention, there is provided an ink comprising a coloring material and an aqueous medium, the coloring material comprising a self-dispersion-type carbon black in which at least one hydrophilic group is bonded to the surface of the carbon black directly or through another atomic group, wherein a $K_a$ value of the ink determined by a Bristow's test method is less than 1.5, and the total amount of monovalent cations in the ink is in a range of 0.05 to 1 mole/liter.

According to another aspect of the present invention, there is provided a method for improving intermittent dischargeability of an ink in an ink-jet recording apparatus having a means for applying energy to an ink in an ink channel of an ink-jet recording head so as to discharge the ink from an orifice, wherein the ink contains a self-dispersion-type carbon black and an aqueous medium, a $K_a$ value of the ink determined by a Bristow's test method is less than 1.5, and the total amount of monovalent cations in the ink is in a range of 0.05 to 1 mole/liter.

According to a further aspect of the present invention, there is provided a method for recording an image comprising a step of applying energy to an ink so as to discharge the ink from a recording head to adhere the ink to a recording medium, wherein the ink comprises a coloring material and an aqueous medium, the coloring material comprising a self-dispersion-type carbon black in which at least one hydrophilic group is bonded to the surface of the carbon black directly or through another atomic group, wherein a $K_a$ value of the ink determined by a Bristow's test method is less than 1.5, and the total amount of monovalent cations in the ink is in a range of 0.05 to 1 mole/liter.

According to a further aspect of the present invention, there is provided a recording unit comprising an ink reservoir for storing an ink and a recording head for ejecting the ink, wherein the ink contains a coloring material comprising a self-dispersion-type carbon black in which at least one hydrophilic group is bonded to the surface of the carbon black directly or through another atomic group, and an aqueous medium, has a $K_a$ value determined by a Bristow's test method of less than 1.5, and comprises a monovalent cation in an amount of from 0.05 to 1 mole/liter.

According to further aspect of the present invention, there is provided a cartridge comprising an ink reservoir for storing an ink, wherein the ink contains a coloring material comprising a self-dispersion-type carbon black in which at least one hydrophilic group is bonded to the surface of the carbon black directly or through another atomic group, and an aqueous medium, has a $K_a$ value determined by a Bristow's test method of less than 1.5, and comprises a monovalent cation in an amount of from 0.05 to 1 mole/liter.

According to a further aspect of the present invention, there is provided an apparatus for printing comprising a recording unit comprising an ink reservoir for storing an ink and a head for ejecting the ink, wherein the ink contains a coloring material comprising a self-dispersion-type carbon black in which at least one hydrophilic group is bonded to the surface of the carbon black directly or through another atomic group, and an aqueous medium, has a $K_a$ value determined by a Bristow's test method of less than 1.5, and comprises a monovalent cation in an amount of from 0.05 to 1 mole/liter.

According to a further aspect of the present invention, there is provided an apparatus for printing comprising an ink cartridge for storing an ink and a recording head for ejecting the ink, wherein the ink contains a coloring material comprising a self-dispersion-type carbon black in which at least one hydrophilic group is bonded to the surface of the carbon black directly or through another atomic group, and an aqueous medium, has a $K_a$ value determined by a Bristow's test method of less than 1.5, and comprises a monovalent cation in an amount of from 0.05 to 1 mole/liter.

According to a still further aspect of the present invention, there is provided an ink set comprising an ink containing a coloring material comprising a self-dispersion-type carbon black in which at least one hydrophilic group is bonded to the surface of the carbon black directly or through another atomic group, wherein a $K_a$ value of the ink determined by a Bristow's test method is less than 1.5, and the total amount of monovalent cations in the ink is in a range of 0.05 to 1 mole/liter, and at least one ink selected from the group containing of an ink consisting a coloring material for cyan, an ink containing a coloring material for magenta, an ink containing a coloring material for yellow, an ink containing a coloring material for red, an ink containing a coloring material for green, and an ink containing a coloring material for blue.

Further objects, features and advantages of the present invention will become apparent from the following description of the preferred embodiments with reference to the attached drawings.

DESCRIPTION OF THE PREFERRED EMBODIMENTS

Figure 1:
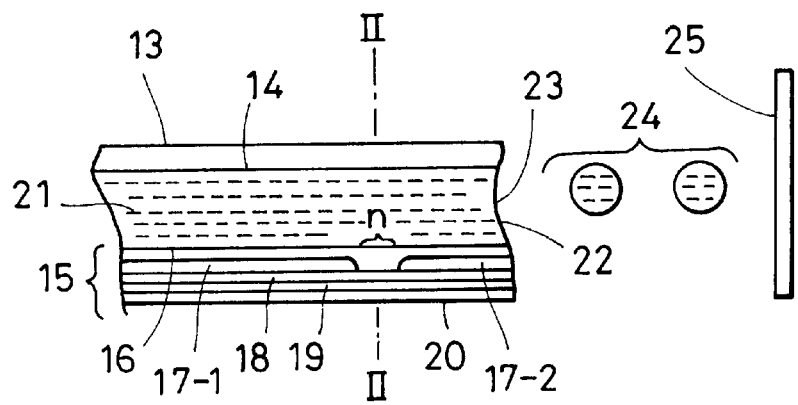
FIG. 1 is a longitudinal cross-sectional view of a head of an ink-jet recording apparatus.

The present invention will now be described in more detail with reference to the preferred embodiments.

In a preferred embodiment in accordance with the present invention, an ink contains a self-dispersion-type carbon black and an aqueous medium. Moreover, a $K_a$ value of the ink determined by a Bristow's test method is less than 1.5, and the total amount of monovalent cations in the ink is in a range of 0.05 to 1 mole/liter. The constituents of the ink will now be described.

Self-Dispersion-Type Carbon Black

The self-dispersion-type carbon black is a carbon black in which at least one hydrophilic group is bonded to the surface of the carbon black directly or through another atomic group. The carbon black having surface hydrophilic groups does not require a dispersant to facilitate dispersion of the carbon black in the ink medium. Preferred self-dispersion-type carbon blacks are ionic carbon blacks.

Cationic Carbon Black

Cationic carbon blacks, which are positively charged, have at least one quaternary ammonium group as a hydrophilic group selected from the following group on the surfaces thereof:

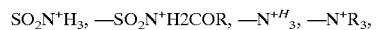

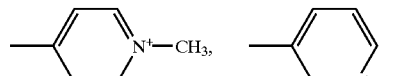

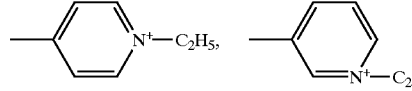

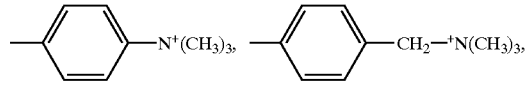

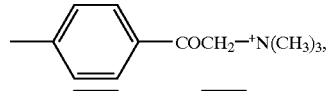

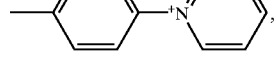

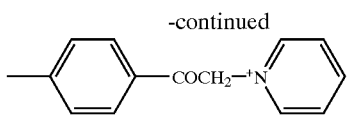

In the above formula, R is alkyl having 1 to 12 carbons, substituted or unsubstituted phenyl, or substituted or unsubstituted naphthyl. Examples of counter ions for the quaternary ammonium ions include $NO_3^-$ and $CH_3COO^-$.

As an exemplary method for making the cationic self-dispersion-type carbon black, carbon black is treated with 3-amino-N-ethylpyridium bromide to introduce N-ethylpyridyl groups represented by the following formula into the carbon black:

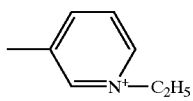

The resulting cationic carbon black exhibits continuous good dispersibility in aqueous media, such as aqueous ink, due to ionic repulsion of carbon black particles without the addition of dispersants.

Anionic Carbon Black

Anionic carbon blacks, which are negatively charged, have at least one hydrophilic group selected from —COOM, —$SO_3M$, —$PO_3HM$, and —$PO_3M_2$ on the surfaces thereof, wherein M is hydrogen, an alkali metal, ammonium, or organic ammonium. Among these groups, anionic carbon blacks having —COOM groups or —$SO_3M$ groups on the surfaces thereof show high dispersibility in aqueous ink. Examples of preferable alkali metals as M in the hydrophobic groups include lithium (Li), sodium (Na), potassium (K), rubidium (Rb), and cesium (Cs). Examples of organic ammoniums include methylammonium, dimethylammonium, trimethylammonium, ethylammonium, diethylammonium, triethylammonium, methanolammonium, dimethanolammonium, and trimethanolammonium. The self-dispersion-type carbon black having surface anionic groups with ammonium or organic ammonium groups as M improves the water resistance of recorded images, because ammonium groups are decomposed to ammonia and the ammonia evaporates after the ink is discharged onto a recording medium. The self-dispersion-type carbon black having the ammonium groups as M is prepared by ion exchange of a self-dispersion-type carbon black having alkali metals as M. For example, the alkali metal ions are directly replaced with ammonium ions, or are replaced with protons by addition of an acid solution and then are replaced with ammonium ions by the addition of an ammonium hydroxide solution.

In a preferable method for making the anionic self-dispersion-type carbon black, which is negatively charged, carbon black is treated with sodium hypochlorite so that —COONa groups are introduced on the surface of the carbon black.

The above-described hydrophilic group may be introduced by direct bonding to the surface of the carbon black, or indirect bonding to the surface of the carbon black via an intermediary atomic group which is bonded to the surface of the carbon black. Examples of intermediary atomic groups include linear or branched alkylene groups having 1 to 12 carbons, substituted or unsubstituted phenylene groups, or substituted or unsubstituted naphthylene groups. Examples of substituents of the substituted phenylene groups and the substituted naphthylene groups include linear or branched alkylene groups having 1 to 12 carbons. Examples of preferable combinations of the intermediary atomic groups and the hydrophilic groups include —$C_2H_4$—COOM, —Ph—$SO_3M$, and —Ph—COOM wherein Ph is phenylene.

The ink in accordance with the present invention may contain only one type of self-dispersion-type carbon black. Alternatively, the ink may contain two or more types of self-dispersion-type carbon blacks to control the color tone. The pigment ink in accordance with the present invention preferably contains 0.1 to 15 percent by weight and more preferably 1 to 10 percent by weight of self-dispersion-type carbon black. The pigment ink may further contain a dye to control the color tone.

Monovalent Cations

The total amount of monovalent cations contained in the ink in accordance with the present invention is in a range of preferably 0.05 to 1 mole/liter and more preferably 0.1 to 0.5 mole/liter. When the total amount of the monovalent cations is controlled to be within this range, intermittent dischargeability is significantly improved. Moreover, the ink shows good preservation stability.

Herein, the "total amount of monovalent cations" indicates the amount of all monovalent cations which are contained and are measurable in the ink. The monovalent cations are present in the ink as counter ions of surface functional groups of the self-dispersion-type carbon black, cations of a pH adjusting agent and a salt as additives. The total amount of the monovalent cations is measured by, for example, a combination of plasma emission spectrometry for quantitative analysis of metal ions and ion chromatography for quantitative analysis of ammonium ions.

Examples of monovalent cations include alkali metal ions, ammonium ions, and organic ammonium ions. Examples of alkali metal ions include a lithium ion, a sodium ion, and a potassium ion. Examples of organic ammonium ions include monoalkyl- to trialkyl-ammonium ions, such as monoethyl- to triethyl-ammonium ions and monomethanol- to trimethanol-ammonium ions.

When the ink containing 0.05 to 1 mole/liter of monovalent cations is discharged from a nozzle followed by suspension of discharge for a given time, a thin film of carbon black and cations is presumed to form at the nozzle section suppressing evaporation of the ink from the nozzle. However, the reasons for the above-described superior characteristics of the ink in accordance with the present invention are not completely clear.

In the present invention, it is more preferable to add at least one of a water soluble organic solvent and a wetting agent to the ink since dischargeability of the ink can greatly be improved. Dischargeability of an ink can be improved by merely adding at least one of a water soluble organic solvent and a wetting agent to the ink, but the improvement in dischargeability observed here exceeds the effect obtainable by adding at least one of a water soluble organic solvent and a wetting agent. The reason why dischargeability can be greatly improved is still under investigation, but it is considered that the effect obtained by defining the total amount of the monovalent cation in the ink and the effect obtained by adding at least one of a water soluble organic solvent and wetting agent to the ink work synergistically.

A method for controlling the total amount of monovalent cations is the addition of the above-described cations as salts. In such a case, examples of preferable cations of the salt include ammonium (most preferable), sodium, and lithium, and examples of preferable counter ions (anions) of the salts include halogen ions, e.g., chloride, acetate, and benzoate. A salt formed of a preferable cation and a preferable counter ion has high affinity for the self-dispersion-type carbon black, and thus the resulting ink has superior intermittent dischargeability.

$K_a$ Value

A parameter representing penetrability of ink into a recording medium is a $K_a$ value determined by a Bristow's test method. The volume V per m² (ml/m²=μm) of the ink which penetrates into the recording medium over an elapsed time t after the ink is ejected is represented by the following Bristow's equation:

$$V=Vr+K_a(t-tw)^{1/2}$$

wherein tw is the constant time at which the ink is absorbed only in uneven portions (having roughness) on the surface of the recording medium and has not yet penetrated into the recording medium, immediately after the ink is discharged onto the recording medium, and Vr is the volume of the ink which is absorbed in the uneven portions on the recording medium. When the elapsed time exceeds the contact time, the volume of the ink which has penetrated into the recording medium increases in proportion to the ½ power of the difference (t–tw). The Ka value is a coefficient of such an increase in volume and corresponds to the penetration rate. The $K_a$ value can be measured by a dynamic penetration tester for liquid by the Bristow's test method, for example, a Dynamic Penetration Tester S made by Toyo Seiki Co., Ltd. In the ink described in the above preferred embodiments of the present invention, it is preferable that the $K_a$ value be controlled to be less than 1.5 and more preferably in a range of 0.2 to less than 1.5 in order to further improve the quality of the recorded images. When the $K_a$ value of the ink is less than 1.5, solid-liquid separation occurs at an early stage in the penetration process of the ink into the recording medium, and thus the resulting image has reduced feathering and high quality. The $K_a$ value by the Bristow's test method in the present invention is measured by using plain paper, such as PB paper made by Canon Kabushiki Kaisha for electrophotographic copying machines, page printers (laser beam printers), and ink-jet printers, or PPC paper for electrophotographic copying machines. The test is performed in a typical office environment, for example, at a temperature of 20 to 25° C., and at a humidity of 40 to 60%. The unit of the $K_a$ value is $[ml \cdot m^2 \cdot msec^{-1/2}]$.

Aqueous Medium

A preferred aqueous medium which imparts the above-described characteristics to the ink is a solvent mixture of water and a water-soluble organic solvent. Water-soluble organic solvent has an effect of preventing the drying of the ink. Deionized water is preferred. Untreated water containing various ionic species is not desirable.

Water-soluble Organic Solvents

Examples of water-soluble organic solvents used in the present invention include alkyl alcohols having 1 to 4 carbon atoms, e.g., methyl alcohol, ethyl alcohol, n-propyl alcohol, isopropyl alcohol, n-butyl alcohol, sec-butyl alcohol, and tert-butyl alcohol; amides, e.g., dimethylformamide and dimethylacetamide; ketones and ketoalcohols, e.g., acetone and diacetone alcohol; ethers, e.g., tetrahydrofuran and dioxane; polyalkylene glycols, e.g., polyethylene glycol and polypropylene glycol; alkylene glycols composed of an alkylene group or alkylene groups of 2 to 6 carbon atoms, e.g., ethylene glycol, propylene glycol, butylene glycol, triethylene glycol, 1,2,6-hexanetriol, thiodiglycol, hexylene glycol, and diethylene glycol; lower alkylether acetate, e.g., polyethylene glycol monomethylether acetate; glycerin; lower alkyl ethers of polyvalent alcohols, e.g., ethylene glycol monomethyl (or monoethyl) ether, diethylene glycol methyl (or ethyl) ether, and triethylene glycol monomethyl (or monoethyl) ether; polyvalent alcohols, e.g., trimethylolpropane and trimethylolethane; and miscellaneous solvents, e.g., N-methyl-2-pyrrolidone, 2-pyrrolidone, 1,3-dimethyl-2-imidazolidinone, and acetylene alcohol. These water-soluble organic solvents may be used alone or in combination.

The content of the water-soluble organic solvents in the ink is not limited and is preferably in a range of 3 to 50 percent of the total weight of the ink. The water content in the ink is preferably in a range of 50 to 95 percent by weight.

Appropriate amounts of a penetrative solvent and a surfactant such as ethylene oxide adduct of acetylene glycol represented by the following formula are added to the ink in accordance with the present invention in order to control the $K_a$ value to be less than 1.5:

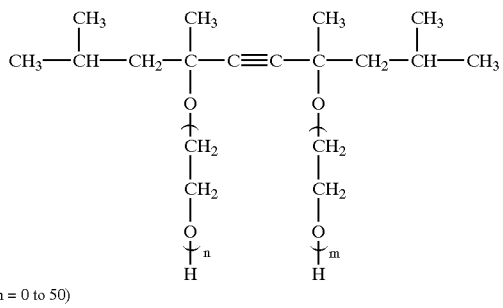

(n + m = 0 to 50)

The aqueous pigment ink in accordance with the present invention may contain other additives, such as surfactants, defoaming agents, antiseptic agents, fungicides, etc. in order to stabilize the ink characteristics. The aqueous coloring material ink may further contain a commercially available dye.

The aqueous pigment ink in accordance with the present invention is preferably used in ink-jet recording in which ink is discharged by applying mechanical force to the ink or thermal energy to the ink to generate bubbles in the ink.

(Ink-jet recording apparatus and ink-jet recording method)

Figure 2:
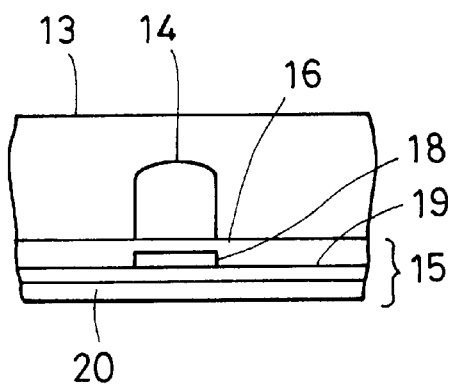
FIG. 2 is a transverse cross-sectional view of a head of an ink-jet recording apparatus.

FIGS. 1 and 2 show a head configuration which is the main section of an ink-jet recording apparatus using thermal energy. FIG. 1 is a cross-sectional view along the ink channel of a head 13, and FIG. 2 is a cross-sectional view taken along line II—II in FIG. 1. The head 13 is prepared by bonding a plate to a heating element substrate 15. The plate is composed of glass, ceramic, silicon, or plastic and is provided with an ink channel or nozzle 14. The heating element substrate 15 includes electrodes 17-1 and 17-2 formed of aluminum, gold, or an aluminum-copper alloy, an exothermic element layer 18 formed of a high-melting-point metal, such as $HfB_2$, TaN, or TaAl, a heat accumulating layer 19 formed of silicon oxide or aluminum oxide, and a substrate 20 formed of a heat dissipating material, such as silicon, aluminum, or aluminum nitride.

When a pulsed electrical signal is applied between the electrodes 17-1 and 17-2, a region, indicated by the letter n, of the heating element substrate 15 is rapidly heated to form bubbles in the ink in contact with the region. The meniscus 23 protrudes by the pressure of the bubbles and is discharged as ink droplets 24 from a discharge orifice 22 towards a recording member 23.

Figure 3:
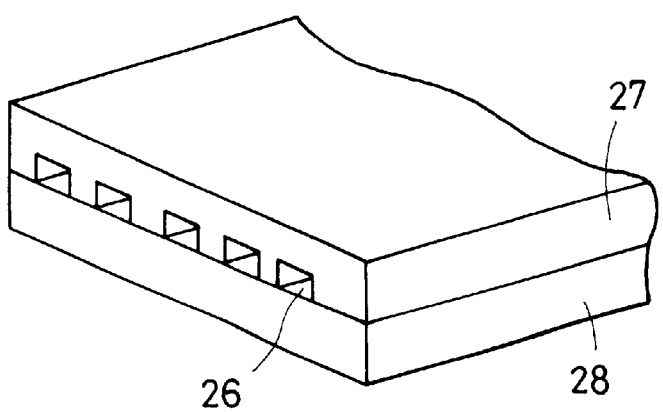
FIG. 3 is a schematic isometric view of a composite head having a plurality of nozzles shown in FIG. 1.

FIG. 3 is a schematic isometric view of a composite head having a plurality of nozzles shown in FIG. 1. The composite head is formed by bonding a glass plate 27 having multiple nozzles 26 and a heating head 28 as in the embodiment shown in FIG. 1.

Figure 4:
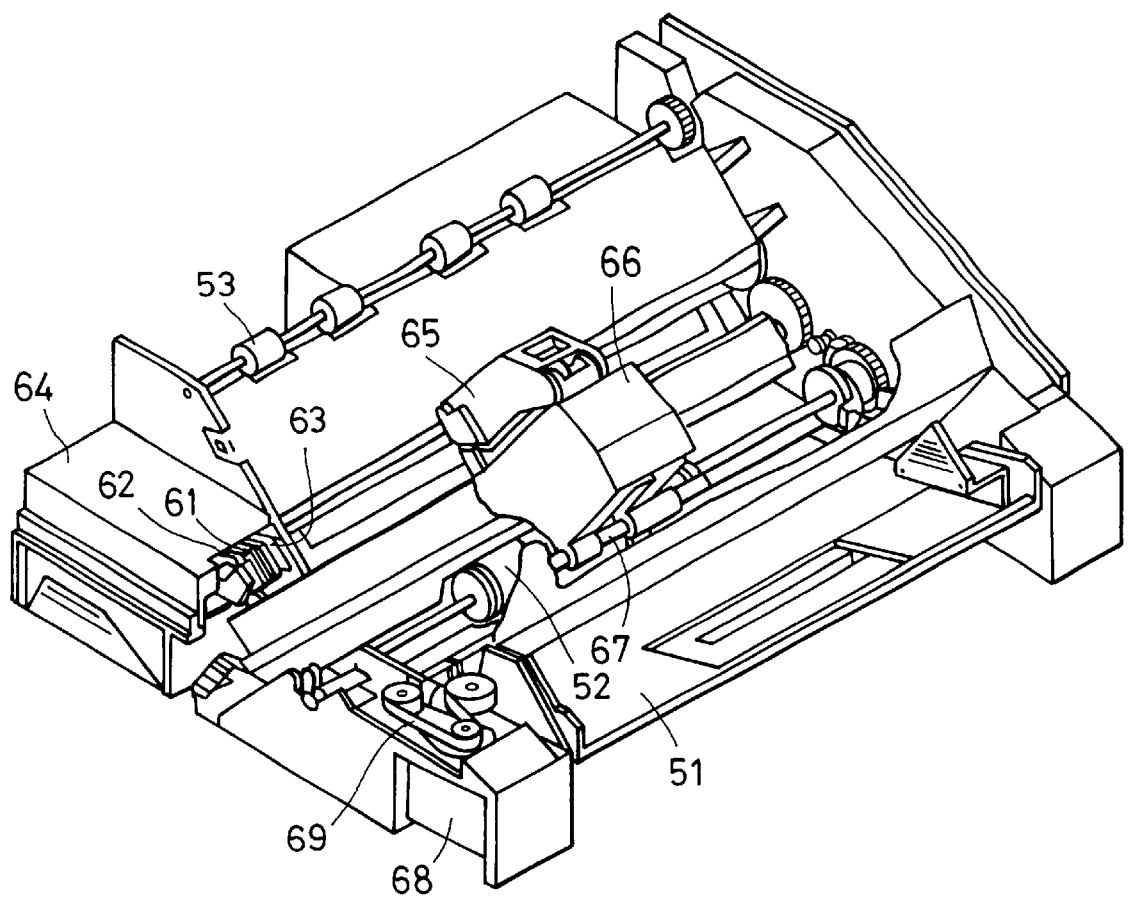
FIG. 4 is an isometric view of an ink-jet recording apparatus.

FIG. 4 is an isometric view of an ink-jet recording apparatus having this head. A blade holder fixes one end of a blade 61 as a wiper so that the blade 61 acts as a cantilever. The blade 61 is disposed in the vicinity of the recording region of a recording head 65. In this embodiment, the blade 61 protrudes to the moving path of the recording head 65.

The ink-jet recording apparatus is provided with a cap 62 for the nozzle face of the recording head 66. The cap 62 moves in a direction which is perpendicular to the moving direction of the recording head 65 so as to be in contact with and cover the ink discharge face. An ink absorber 63 is provided adjacent to the blade 61 and protrudes to the moving path of the recording head 65, as does the blade 61. The blade 61, the cap 62, and the ink absorber 63 constitute a discharge recovery section 64, and the blade 61 and the ink absorber 63 remove water and dust on the nozzle face.

The ink-jet recording apparatus further includes a recording head 65 having a discharging energy generating means for discharging the ink onto a recording member opposing the nozzle face, and a carriage 66 for moving the recording head 65. The carriage 66 can slide on a guide axle 67 and a part of the carriage 66 is connected to a belt 69 which is driven by a motor 78 (the connection is not shown in the drawing). Thus, the carriage 66 can move along the guide axle 67 in the recording region of the recording head 65 and the other regions in the vicinity thereof. Moreover, the ink-jet recording apparatus includes a paper feeder 51 for feeding a recording medium and a feeding roller 52 which is driven by a motor (not shown in the drawing).

The recording medium is fed to a position opposite the nozzle face of the recording head 65 and is discharged to a discharging section provided with a discharging roller 53. When the recording head 65 returns to the home position after the completion of recording, the cap 62 of the discharge recovery section 64 withdraws from the moving path of the recording head 65, whereas the blade 61 protrudes into the moving path. As a result, the nozzle face of the recording head is wiped. When the cap 62 is in contact with the nozzle face of the recording head 65, the cap moves so as to protrude to the moving path of the recording head 65. When the recording head 65 moves from the home position to the starting position for recording, the cap 63 and the blade 61 are located at positions which are the same as those in the wiping mode. As a result, the nozzle face of the recording head 65 is also wiped in this moving mode.

The recording head also returns to the home position adjacent to the recording region at a given time interval for wiping when the recording head moves in the recording region during recording.

Figure 5:
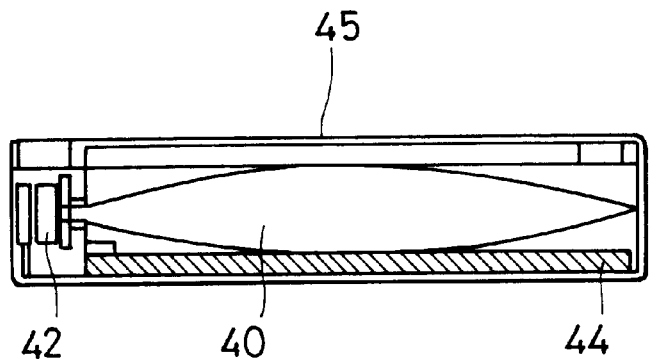
FIG. 5 is a longitudinal cross-sectional view of an ink cartridge.

FIG. 5 is a longitudinal cross-sectional view of an ink cartridge 45 which is provided as an ink-feeding member to the recording head. The ink cartridge contains ink which is fed from, for example, a tube. The ink cartridge 45 has an ink container, such as an ink bag, and the top of the ink cartridge 45 is covered with a rubber stopper 42. A needle (not shown in the drawing) is inserted into the stopper 42 to supply the ink in the ink container 40 to the head. An ink absorber 44 is provided to absorb waste ink. Preferably, the face which is in contact with the ink of the ink container is formed of a polyolefin, particularly polyethylene.

Figure 6:
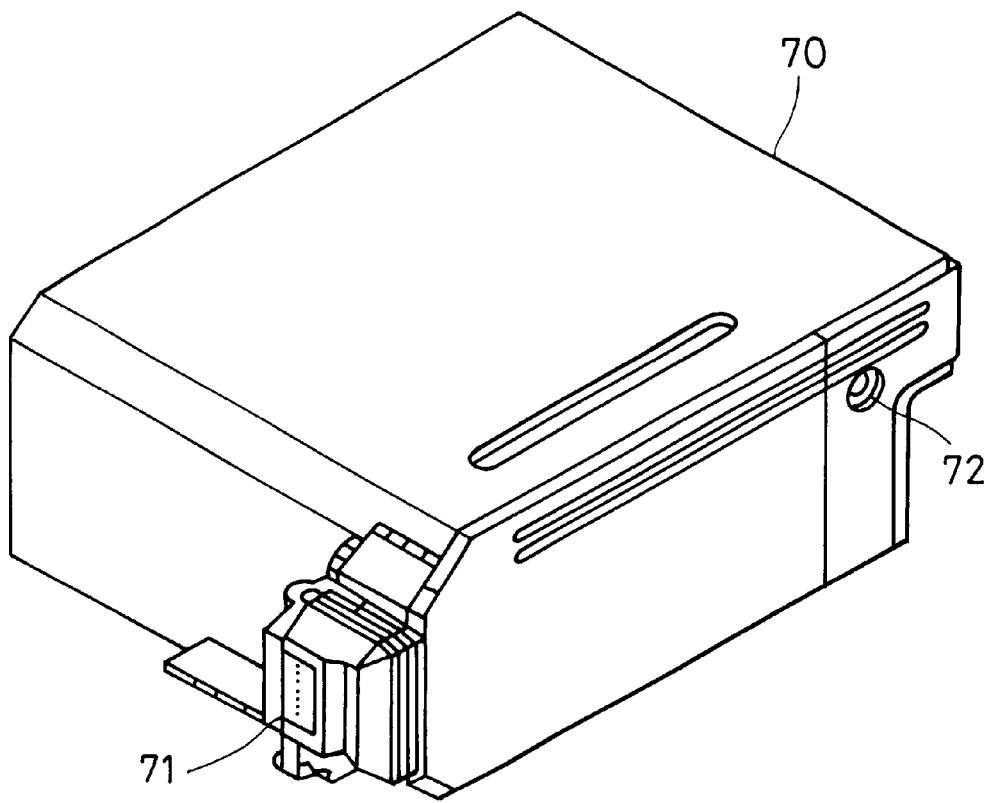
FIG. 6 is an isometric view of a recording unit.

In the present invention, an ink-jet recording apparatus in which a head and an ink cartridge are integrated, shown in FIG. 6, is also preferably used, instead of the above ink-jet recording apparatus independently having a head and an ink cartridge. In FIG. 6, a recording unit 70 includes an ink container, for example, an ink absorber, and the ink in the ink absorber is discharged as droplets from a head section 71 having a plurality of orifices. In the present invention, the ink absorber is preferably formed of polyurethane.

Alternatively, the ink container may be an ink bag not having the ink absorber, but having a spring therein. The recording unit 70 has a communicating hole which communicates the interior of the cartridge with the air. This recording unit 70 is used instead of the recording head 65 shown in FIG. 4 and is mountable to and detachable from the carriage 66.

Figure 7:
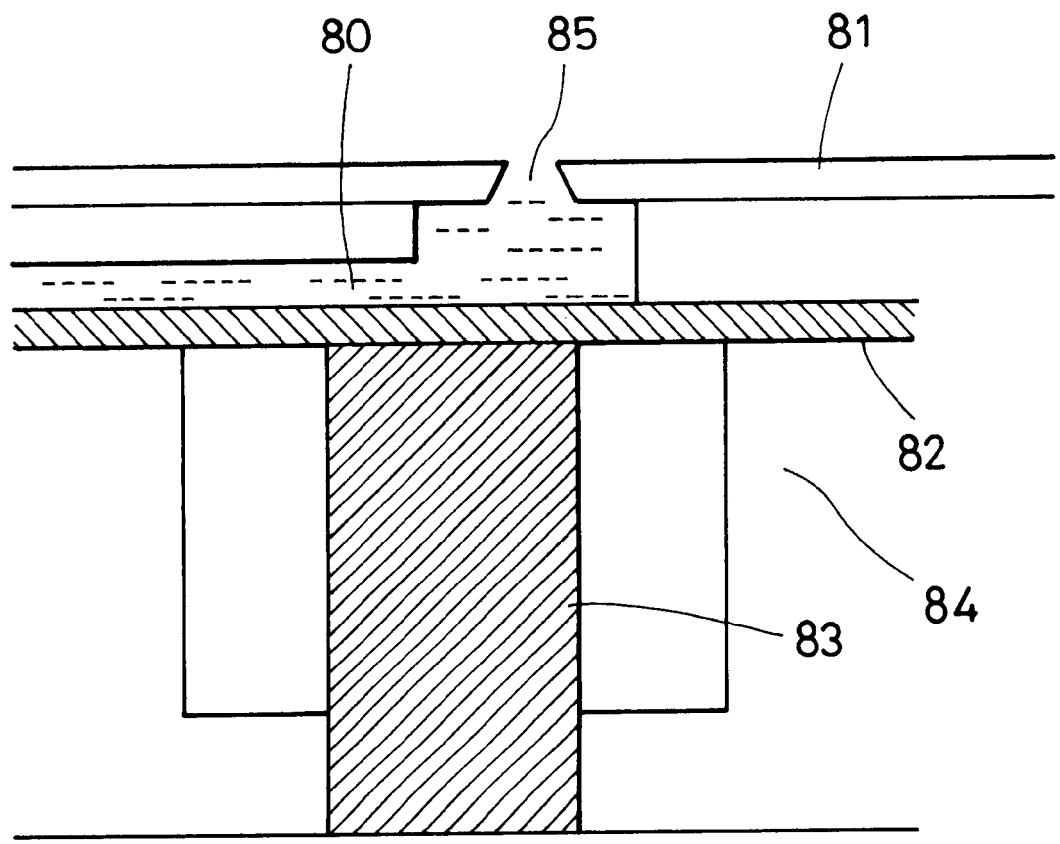
FIG. 7 is a schematic cross-sectional view of another embodiment of an ink-jet recording head.

An example of an ink-jet recording apparatus using mechanical force is an on-demand ink jet recording head having a nozzle forming substrate provided with a plurality of nozzles, a pressure generating element which is composed of a piezoelectric material and a conductive material and which faces the nozzles, and an ink filling the periphery of the pressure generating element. A voltage is applied to cause displacement of the pressure-generating element, and ink droplets are discharged from the nozzle. FIG. 7 is a schematic cross-sectional view of a recording head of this ink-jet recording apparatus.

With reference to FIG. 7, the head includes an ink channel 80 communicating with an ink chamber (not shown in the drawing), an orifice plate 81 for discharging ink droplets of predetermined volumes, a vibrating plate 82 for directly applying pressure to the ink, a piezoelectric element 83 which is deformed by electrical signals, and a substrate 84 for fixing the orifice plate 81 and the vibrating plate 82.

The ink channel 80 is formed of a photosensitive resin. The orifice plate 81 is formed of a metal, such as stainless steel or nickel, having a nozzle 85 which is formed by electrocasting, press machining, or perforation. The vibrating plate 82 is formed of a metal film of stainless steel, nickel, or titanium, or of a high-resilience resin film. The piezoelectric element 83 is formed of a dielectric material, such as barium titanate or PZT (lead zirconate titanate).

In a recording mode of the recording head, pulsed voltages are applied to the piezoelectric element 83 to generate strain stress. The vibrating plate 82 connected to the piezoelectric element 83 is deformed by the energy of the strain stress and applies pressure vertically to the ink in the ink channel 80 so that ink droplets (not shown in the drawing) are discharged from the nozzle 85 of the orifice plate 81.

Such a recording head can be mounted into a recording apparatus as shown in FIG. 4. The operation of the recording apparatus is the same as the above.

Ink Set

The ink in accordance with the above embodiments of the present invention is a black ink. This black ink can provide an ink set in a combination with at least one color ink selected from the group consisting of a color ink containing a yellow pigment, a color ink containing a magenta pigment, a color ink containing a cyan pigment, a color ink containing a red pigment, a color ink containing a blue pigment, and a color ink containing a green pigment. This ink set can be used to form high-quality color images.

As described above, products of ink-jet recording in accordance with the present invention always have high density and good edge sharpness. The high-quality ink-jet recording is stable during operation.

EXAMPLES

The present invention will now be described in more detail with reference to the following nonlimiting Examples and Comparative Examples. In the sections below, "wt %" refers to percent by weight, unless otherwise specified.

Preparation of Pigment Dispersion

Into a solution of 5.3 g of water and 5 g of concentrated hydrochloric acid, 1.58 g of anthranyl acid was added at 5°

C. While stirring the solution in an ice bath so as to maintain the solution at or below 10° C., a solution of 8.7 g of water at 5° C. and 1.78 g of sodium nitrite was added. The solution was stirred for 15 minutes, and then 20 g of carbon black having a specific surface area of 320 m$^2$/g and a DBP absorption of 120 ml/100 g was added to the solution, which was stirred for another 15 minutes. The resulting slurry was filtered through a Toyo Roshi No. 2 filter paper (made by Advantis K.K.), and the pigment particles were thoroughly washed with water and were dried in an oven at 110° C. Water was added to the pigment to prepare an aqueous pigment solution having a pigment content of 10 percent by weight. A pigment dispersion of a self-dispersion-type carbon black having —Ph—COONa groups on the surface thereof was prepared.

Example 1

The following components were mixed, and the mixture was thoroughly stirred. The solution was filtered under pressure using a microfilter (made by Fuji Photo Film Co., Ltd.) having a pore size of 3.0 μm to prepare an ink in accordance with the present invention.

| | |
|---|---|
| The above pigment dispersion | 50 wt % |
| Sodium chloride | 1 wt % |
| Trimethylolpropane | 6 wt % |
| Glycerin | 6 wt % |
| Diethylene glycol | 6 wt % |
| Acetylene glycol, ethylene oxide adduct (Trade name: Acetylenol EH) | 0.2 wt % |
| Water | 30.8 wt % |

The total cation content of the ink which was measured with an induced coupled plasma (ICP) emission spectrometer (trade name: SPS400 made by Seiko Instrument Inc.) and an ion chromatograph (trade name: Ion Chromatograph DX-199 made by DIONEX JAPAN) was 0.19 mole/liter. The average absorption coefficient $K_a$ of ink by the Bristow's test method, which was measured using a Dynamic Penetration Tester S made by Toyo Seiki Co., Ltd., using the following five plain paper sheets A, B. C, D, and E for copying, was 1.1.

A: PPC sheet NSK made by Canon Kabushiki Kaisha
B: PPC sheet NDK made by Canon Kabushiki Kaisha
C: PPC sheet 4024 made by Xerox Corporation
D: PPC sheet Provar Bond made by Fox River Paper Company
E: Neusiedler PPC paper for Canon Kabushiki Kaisha Example 2

The following components were mixed, and the mixture was thoroughly stirred. The solution was filtered under pressure using a microfilter (made by Fuji Photo Film Co., Ltd.) having a pore size of 3.0 μm to prepare an ink in accordance with the present invention.

| | |
|---|---|
| The above pigment dispersion | 45 wt % |
| Ammonium benzoate | 5 wt % |
| Trimethylolpropane | 6 wt % |
| Acetylene glycol, ethylene oxide adduct (Trade name: Acetylenol EH) | 0.15 wt % |
| Glycerin | 5 wt % |
| Ethylene glycol | 5 wt % |
| Water | 33.85 wt % |

The total cation content of the ink which was measured as in Example 1 was 0.38 mole/liter. The average absorption coefficient $K_a$ of ink by the Bristow's test method using the plain paper sheets A, B, C, D, and E, which was measured as in Example 1, was 1.2.

Comparative Example 1

The following components were mixed, and the mixture was thoroughly stirred. The solution was filtered under pressure using a microfilter (made by Fuji Photo Film Co., Ltd.) having a pore size of 3.0 μm to prepare an ink for comparison.

| | |
|---|---|
| The above pigment dispersion | 50 wt % |
| Trimethylolpropane | 6 wt % |
| Acetylene glycol, ethylene oxide adduct (Trade name: Acetylenol EH) | 0.15 wt % |
| Glycerin | 5 wt % |
| Ethylene glycol | 5 wt % |
| Water | 33.85 wt % |

The total cation content of the ink which was measured as in Example 1 was 0.02 mole/liter. The average absorption coefficient $K_a$ of ink by the Bristow's test method using plain paper sheets A, B, C, D, and E, which was measured as in Example 1, was 0.6.

Table 1 summarizes the properties of the black inks of Examples 1 and 2 and Comparative Example 1.

TABLE 1

| | Added Cation Source | Total Cation Content (mole/liter) | Average $K_a$ by Bristow's method |
|---|---|---|---|
| Example 1 | NaCl | 0.19 | 1.1 |
| Example 2 | Ph—COONH$_4$ | 0.38 | 1.2 |
| Comparative Example 1 | Nothing | 0.02 | 0.6 |

The inks of Examples 1 and 2, and Comparative Example 1 were evaluated using an ink-jet recording apparatus BJF-600 (made by Canon Kabushiki Kaisha) having an on-demand type multiple-nozzle recording head which discharges the inks by thermal energy according to recording signals, as follows. The results are shown in Table 2.

(1) Intermittent Dischargeability

The ink-jet recording apparatus containing each ink was allowed to stand for 1 hour in a 15° C./10% thermohygrostat chamber. Ink corresponding to 1 dot was discharged from each nozzle. After a 5-second pause, the ink was discharged in the same manner. This discharge operation was repeated 10 times in total, and prints were evaluated according to the following standard.

a: No defects were observed through 10 printing cycles.
b: Slight defects were observed through 10 printing cycles.
c: Small defects were observed through 10 printing cycles, but these were negligible in actual use.
d: Clear defects were observed through 10 printing cycles.

(2) Density of Printed Characters

Printing was performed to the above plain paper sheets A, B, C, D, and E using the ink-jet recording apparatus containing each of the inks, and the densities of printed characters were measured by a Macbeth densitometer and were evaluated according to the following standard.
- a: Average density on the plain paper sheets A to E was 1.4 or more.
- b: Average density on the plain paper sheets A to E was 1.3 to less than 1.4.
- c: Average density on the plain paper sheets A to E was less than 1.3.

(3) Fixing Property

Alphanumeric characters were continuously printed on the plain paper sheets A to E using the ink-jet recording apparatus containing each ink. Attachment of ink to the back face of each sheet, from ink ejected on the previous sheet was visually observed and was evaluated based on the following standard.
- a: Substantially no attachment was observed on the back face of each sheet.
- b: Slight attachment was observed on the back face of each sheet.
- c: Noticeable attachment was observed on the back face of each sheet.

TABLE 2

|  | Intermittent Dischargeability | Densities of Printed Characters | Fixing Property |
| --- | --- | --- | --- |
| Example 1 | a | a | a |
| Example 2 | a | a | a |
| Comparative Example 1 | c | b | b |

While the present invention has been described with reference to what are considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink containing a coloring material and an aqueous medium, the coloring material comprising a self-dispersing carbon black in which at least one hydrophilic group is bonded to the surface of the carbon black directly or through another atomic group, wherein a $K_a$ value of the ink determined by a Bristow's test method is less than 1.5, and the total amount of monovalent cations in the ink is in a range of 0.05 to 1 mole/liter.

2. An ink according to claim 1, wherein the hydrophilic group is selected from the group consisting of —COOM, —SO₃M, —PO₃HM, and —PO₃M₂, wherein M is a hydrogen, an alkali metal, ammonium, or an organic ammonium.

3. An ink according to claim 1, wherein the monovalent cation is at least one selected from the group consisting of alkali metal ions, ammonium ion, and organic ammonium ions.

4. An ink according to claim 1, wherein the monovalent cation is ammonium ion.

5. An ink according to claim 1, wherein the ink contains a total amount of 0.1 to 0.5 mole/liter of monovalent cations.

6. An ink according to claim 1, wherein the $K_a$ value is in a range of 0.2 to less than 1.5.

7. A method for improving intermittent dischargeability of an ink in an ink-jet recording apparatus having a means for applying energy to an ink in an ink channel of an ink-jet recording head so as to discharge the ink from an orifice, wherein the ink contains a self-dispersing carbon black and an aqueous medium, a $K_a$ value of the ink determined by a Bristow's test method is less than 1.5, and the total amount of monovalent cations in the ink is in a range of 0.05 to 1 mole/liter.

8. A method for improving intermittent dischargeability of an ink according to claim 7, wherein at least one hydrophilic group is bonded to the surface of the self-dispersing carbon black directly or through another atomic group.

9. A method for improving intermittent dischargeability of an ink according to claim 7, wherein the hydrophilic group is selected from the group consisting of —COOM, —SO₃M, —PO₃HM, and —PO₃M₂, wherein M is a hydrogen, an alkali metal, ammonium, or an organic ammonium.

10. A method for improving intermittent dischargeability of an ink according to claim 7, wherein the monovalent cation is at least one selected from the group consisting of alkali metal ions, ammonium ion, and organic ammonium ions.

11. A method for improving intermittent dischargeability of an ink according to claim 7, wherein the monovalent cation is ammonium ion.

12. A method for improving intermittent dischargeability of an ink according to claim 7, wherein the ink contains a total amount of 0.1 to 0.5 mole/liter of monovalent cations.

13. A method for improving intermittent dischargeability of an ink according to claim 7, wherein the $K_a$ value is in a range of 0.2 to less than 1.5.

14. A method for recording an image comprising a step of applying energy to an ink according to any one of claims 1 to 6 so as to discharge the ink from a recording head to adhere the ink to a recording medium.

15. A method for recording an image according to claim 14, wherein the energy is thermal energy.

16. A method for recording an image according to claim 14, wherein the energy is mechanical energy.

17. A method for recording an image according to claim 14, wherein the recording medium is plain paper.

18. A recording unit comprising an ink reservoir storing an ink according to any one of claims 1 to 6 and a recording head for discharging the ink.

19. An ink cartridge comprising an ink reservoir section storing an ink according to any one of claims 1 to 6.

20. An apparatus for printing comprising a recording unit comprising an ink reservoir storing an ink according to any one of claims 1 to 6, and a recording head for discharging the ink.

21. An apparatus for printing comprising a recording head comprising an ink cartridge storing an ink according to any one of claims 1 to 6, and a recording head for ejecting the ink.

22. An image recording apparatus according to claim 21, further comprising an ink supply section for supplying the ink from the ink cartridge to the recording head.

23. An ink set comprising an ink according to any one of claims 1 to 6 and a color ink containing at least one coloring material selected from the group consisting of a cyan coloring material, a magenta coloring material, a yellow coloring material, a red coloring material, a green coloring material, and a blue coloring material.

* * * * *

UNITED STATES PATENT AND TRADEMARK OFFICE
CERTIFICATE OF CORRECTION

PATENT NO. : 6,572,692 B1  Page 1 of 1
DATED : June 3, 2003
INVENTOR(S) : Koichi Osumi et al.

It is certified that error appears in the above-identified patent and that said Letters Patent is hereby corrected as shown below:

<u>Title page,</u>
Item [*] Notice, insert:
-- This patent issued on a continued prosecution application filed under 37 CFR 1.53(d), and is subject to the twenty year patent term provisions of 35 U.S.C. 154(a)(2). --

Item [56], References Cited, FOREIGN PATENT DOCUMENTS, insert
-- WO   WO 96/18696   6/1996
   EP   0 819 737 A2   1/1998
   EP   0 842 994 A1   5/1998
   EP   0 969 054 A1   1/2000 --.

<u>Column 3,</u>
Line 20, "to" should read -- to a --.

<u>Column 7,</u>
Line 22, "Ka" should read -- $K_a$ --.

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,572,692 B1
DATED : June 3, 2003
INVENTOR(S) : Koichi Osumi et al.

It is certified that error appears in the above-identified patent and that said Letters Patent is hereby corrected as shown below:

Title page,
Item [*] Notice, insert:
-- This patent issued on a continued prosecution application filed under 37 CFR 1.53(d), and is subject to the twenty year patent term provisions of 35 U.S.C. 154(a)(2). --

Item [56], References Cited, FOREIGN PATENT DOCUMENTS, insert
-- WO   WO 96/18696   6/1996
  EP   0 819 737 A2   1/1998
  EP   0 842 994 A1   5/1998
  EP   0 969 054 A1   1/2000 --.

Column 3,
Line 20, "to" should read -- to a --.

Column 7,
Line 22, "Ka" should read -- $K_a$ --.

Signed and Sealed this

Twenty-first Day of December, 2004

JON W. DUDAS
*Director of the United States Patent and Trademark Office*